US010259436B2

(12) United States Patent
Lüchau et al.

(10) Patent No.: US 10,259,436 B2
(45) Date of Patent: Apr. 16, 2019

(54) BRAKE MODULATOR FOR A COMPRESSED AIR BRAKING SYSTEM OF A VEHICLE

(71) Applicant: WABCO GmbH, Hannover (DE)

(72) Inventors: Karsten-Wilhelm Lüchau, Lachendorf (DE); Armin Sieker, Bielefield (DE); Arne Stephan, Hannover (DE); Olaf Wichmann, Wennigsen (DE)

(73) Assignee: WABCO GMBH, Hannover (DE)

( * ) Notice: Subject to any disclaimer, the term of this patent is extended or adjusted under 35 U.S.C. 154(b) by 12 days.

(21) Appl. No.: 15/544,789

(22) PCT Filed: Jan. 13, 2016

(86) PCT No.: PCT/EP2016/000049
§ 371 (c)(1),
(2) Date: Jul. 19, 2017

(87) PCT Pub. No.: WO2016/116260
PCT Pub. Date: Jul. 28, 2016

(65) Prior Publication Data
US 2018/0001877 A1 Jan. 4, 2018

(30) Foreign Application Priority Data
Jan. 22, 2015 (DE) .................. 10 2015 000 763

(51) Int. Cl.
B60T 8/38 (2006.01)
B60T 15/18 (2006.01)
(Continued)

(52) U.S. Cl.
CPC ............... B60T 8/38 (2013.01); B60T 8/342 (2013.01); B60T 13/26 (2013.01); B60T 15/182 (2013.01)

(58) Field of Classification Search
CPC . B60T 13/36; B60T 8/38; B60T 8/342; B60T 13/26; B60T 15/182; B60T 15/12; B60T 15/046
See application file for complete search history.

(56) References Cited

U.S. PATENT DOCUMENTS 3,183,042 A * 5/1965 Bueler .................. B60T 15/046
137/102
3,934,942 A * 1/1976 Klimek ................. B60T 15/046
303/52
(Continued)

FOREIGN PATENT DOCUMENTS

| DE | 3741790 A1 | 6/1989 |
| EP | 0319670 A2 | 6/1989 |
| EP | 2266854 A2 | 12/2010 |

OTHER PUBLICATIONS

PCT/EP2016/000049 International Search Report dated Apr. 14, 2016, 6 pages.
(Continued)

Primary Examiner — Melanie Torres Williams
(74) Attorney, Agent, or Firm — Warner Norcross & Judd LLP

(57) ABSTRACT

A brake modulator (1) for a compressed air braking system (80) of a vehicle is disclosed. The brake modulator (1) has a main housing (8) and two relay valves (2, 3). Each relay valve is configured with a delivery valve seat (31, 131) and a vent valve seat (30, 130) and a vent position, wherein compressed air inlets (2d, 3d) are connected via a transverse bore (27) to a common compressed air inlet port (25, 26), and a delivery duct (12a, 112a) extends in the axial direction (A) in each relay valve (2, 3). The relay valves (2, 3) have guide body inserts (12, 112) which are inserted into a longitudinal bore (29) of the main housing (8), which longitudinal bore (29) extends in the axial direction (A), and
(Continued)

the relay valves (2, 3) in each case have the delivery duct (12*a*, 112*a*).

20 Claims, 2 Drawing Sheets

(51) Int. Cl.
*B60T 8/34* (2006.01)
*B60T 13/26* (2006.01)

(56) References Cited

U.S. PATENT DOCUMENTS 4,145,091 A 3/1979 Bueler et al.
4,915,458 A 4/1990 Deike et al.

OTHER PUBLICATIONS

English language abstract and machine translation for EP2266854 (A2) extracted from http://worldwide.espacenet.com database on Aug. 30, 2017, 13 pages.

* cited by examiner

BRAKE MODULATOR FOR A COMPRESSED AIR BRAKING SYSTEM OF A VEHICLE

CROSS-REFERENCE TO RELATED APPLICATIONS

This application is the National Stage of International Application No. PCT/EP2016/000049, filed on 13 Jan. 2016, which claims priority to and all advantages of German Patent Application No. 10 2015 000 763.7, filed on 22 Jan. 2015, the content of which is hereby incorporated by reference.

FIELD OF THE INVENTION

The invention generally relates to a brake modulator and, more specifically, to a brake modulator for a compressed air braking system of a vehicle.

BACKGROUND OF THE INVENTION

The installation of a brake modulator varies internationally according to different systems and standards, with both a direct connection to a compressed air reservoir and a connection via a pneumatic line being known. It is therefore advantageous to equip the brake modulator with two compressed air ports, both of which serve as compressed air inlets for relay valves. The redundant compressed air port may be closed, for example, by a plug, although connection of the two compressed air ports in parallel is also possible in principle.

Relay valves may be arranged in a longitudinal or axial direction of a common main housing, which may be configured as a light alloy die-casting. The relay valves may adopt their three valve positions—that is, the delivery position, the pressure-maintenance position and the vent position—independently of one another. A compact construction with a high air flow rate is therefore possible. The air supply may be effected, in particular, in a transverse direction (perpendicular to the axial direction) and centrally with respect to the compressed air inlets of the relay valves.

It is found, however, that such a construction, with the compressed air connection provided transversely, gives rise to a complex shaping of the main housing. The air delivery ducts extending from the compressed air port to a delivery valve seat are therefore generally configured as undercuts or similarly complex duct configurations in a body of the main housing.

Furthermore, the compressed air ports are typically provided from opposite sides and are axially offset from one another; such a pneumatic supply is, however, generally asymmetrical with respect to the relay valves, so that the relay valves may in some cases exhibit a non-uniform pressure build-up.

SUMMARY OF THE INVENTION

The present invention provides a brake modulator for a compressed air braking system, and such a compressed air braking system, which ensure reliable functionality at low cost.

The brake modulator comprises two relay valves each configured with a guide body insert which has a delivery duct from a compressed air port to a delivery valve seat. In particular, two compressed air ports may be arranged in a transverse direction, that is, perpendicularly to the axial direction and opposite one another, and may be connected to one another by a transverse bore such that the delivery ducts in each case start from the transverse bore.

The guide body insert may be configured, in particular, as a plastics part, for example as a plastics injection molding. In specific embodiments, an outer face of the guide body insert is in contact with the axial bore of the main housing and forms the delivery duct extending radially inwards, for example, to an inner wall or central wall. On its radially inner side it may also form a vent duct from the vent valve seat to the vent outlet.

Relevant functions of the relay valve can therefore be implemented via the guide body insert, which advantageously serves to guide a valve body which in turn is provided to form both the delivery valve seat and the vent valve seat. The valve body is therefore guided slidingly on the guide body insert, for example with a spring-preloading provided by a spring which is located in the guide body insert and presses the valve body axially outwards.

Because important functions of the relay valve may be implemented by the guide body insert, the axial or longitudinal bore can be formed in the main housing in a constructionally simple manner, in particular without an undercut. Production is therefore very simple and inexpensive, in that an axial or longitudinal bore is formed together with a transverse bore which intersects the axial bore perpendicularly and advantageously has widened compressed air ports. In addition to the simplification of manufacture, a symmetrical configuration can be achieved in certain embdoiments with regard to the first and second relay valves; the first and second relay valves with their guide body inserts can therefore extend symmetrically outwards axially from the central transverse bore between them.

In these embodiments, the advantage of a symmetrical pressure configuration and a uniform pressure build-up to both sides may be achieved. Thus, at each of the compressed air ports compressed air can, for example, be supplied first in a transverse direction towards the axial center, and then fed symmetrically outwards to the left and right through the relay valves.

Furthermore, subsequent machining is simpler or can be omitted entirely, since relevant surfaces may be formed by the guide body insert instead of by metal surfaces of the die-casting.

The further implementation of the valve seats may be effected by an axially displaceable valve piston acting from axially outside and pressing on the valve body, thereby forming the vent valve seat. By pressing the valve body axially inwards, the valve piston additionally opens the delivery valve seat, which may be formed, for example, between the valve body and a valve seat ring.

The valve piston may be received and axially guided in, for example, a cover fitted axially from the outside. This configuration, too, is therefore constructionally simple and can be installed simply by application from the outside.

Assembly can therefore be effected by first forming the main housing as a light alloy die-casting having, for example one or two axial slides to form the axial bore, as well as one or two central slides to form the transverse bore, advantageously with the radially outer widening of the compressed air ports. For this implementation of the bore no subsequent machining is in principle necessary, since no moving parts are involved. The guide body inserts can then be inserted axially into the axial bore from outside, for example with sealing rings, and optionally with spring and valve body, already installed. The valve seat ring is then installed from outside and the unit formed by cover and valve piston is fitted in a simple manner and secured, for example, by screws.

The entire compressed air braking system can therefore comprise such a brake modulator implementing both relay valves, together with an electro-pneumatic ABS control circuit.

BRIEF DESCRIPTION OF THE DRAWING

The invention is described in greater detail below with reference to the accompanying figures, in which.

DETAILED DESCRIPTION

Figure 1:
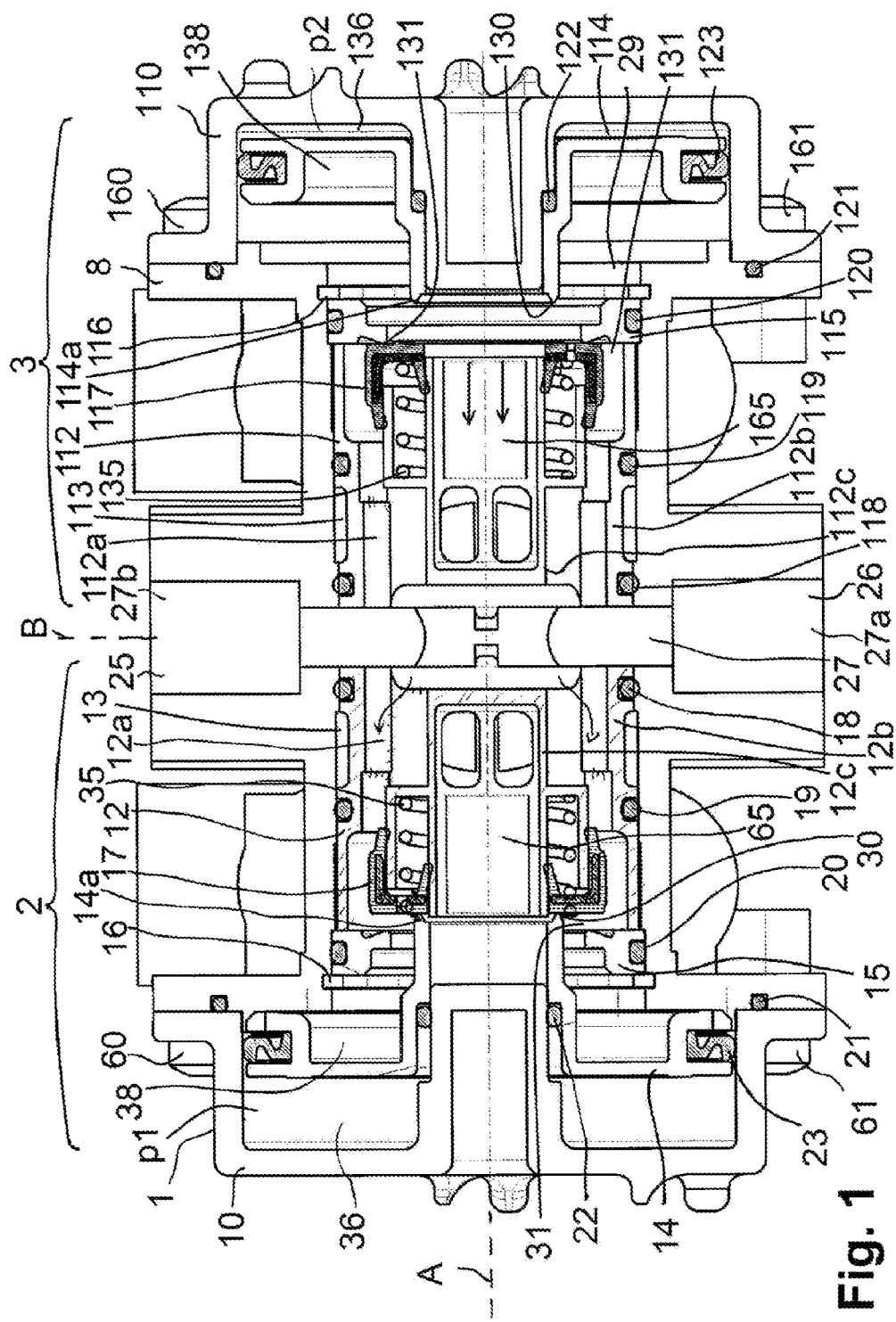
FIG. 1 shows a brake modulator in a sectional view according to one embodiment of the invention, with an actuated relay valve in a delivery position and an unactuated relay valve in a vent position.

With reference to the specific embodiment of the Figures, wherein like numerals generally indicate like parts throughout the several views, a brake modulator is shown at 1. The brake modulator 1 serves as an ABS brake modulator 1 and has the functionality of two pneumatically activated relay valves 2 and 3, of which a first relay valve 2 has a pneumatic control pressure inlet 2a connected to a pneumatic control pressure line 4, together with a compressed air outlet 2b to which a brake line 6 is connected, and a vent 2c; correspondingly, a second relay valve 3 has a pneumatic control inlet 3a to which a pneumatic control line 5 is connected, together with a compressed air outlet 3b to a brake line 7, and a vent 3c.

In its structure as shown in FIG. 1, the brake modulator 1 comprises a main housing 8, a first cover 10 as part of the first relay valve 2, and a second cover 110 as part of the second relay valve 3. In the further description the reference symbols of the elements of the first and second relay valves 2, 3 correspond to one another, so that in each case only one of the relay valves 2, 3, showing different positions, will be referred to in detail, although the references also apply respectively to the other relay valve 2 or 3.

In the main housing 8, the first relay valve 2 comprises a first guide body insert 12, a first valve piston 14, a valve seat ring 15 with a securing ring 16, and sealing ring 18, 19, 20, 21, 22, 23. Correspondingly, a second guide body insert 112, a second valve piston 114, a securing ring 116 and sealing ring 118, 119, 120, 121, 122 and 123 are included as parts of the second relay valve 3.

As can be seen from the embodiment of FIG. 1, the structure, or hardware structure, of the relay valves 2 and 3 are mirror-symmetrical with respect to a central axis B, which in turn is perpendicular to the housing axis and axis of symmetry A. The entire brake modulator 1 is substantially symmetrical with respect to the axis of symmetry A, with corresponding configuration of openings, etc., as structuring elements in the circumferential direction about the axis of symmetry A.

Figure 2:
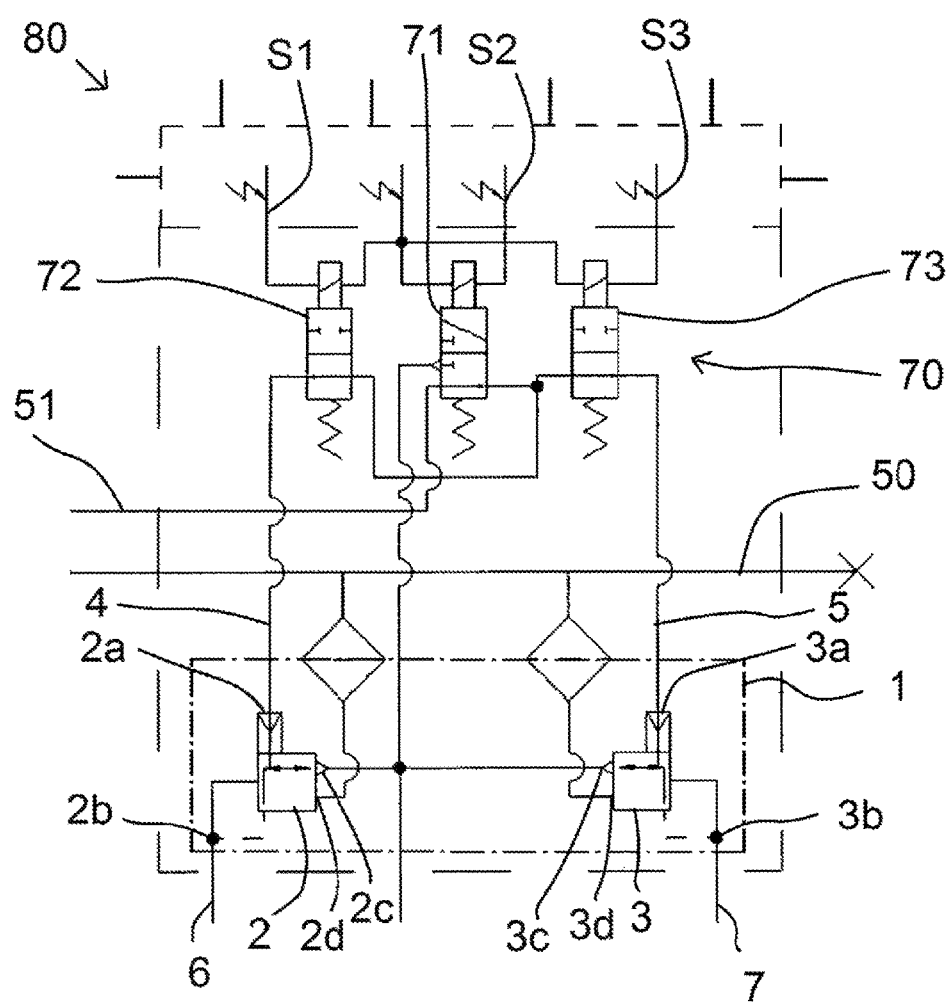
FIG. 2 shows an electro-pneumatic circuit diagram with the brake modulator from FIG. 1.

According to the specific embodiment shown in FIG. 1, the main housing 8 has two compressed air inlet ports 25, 26, only one of which is generally required; consequently, one of the two compressed air inlet ports 25, 26 may be closed, for example by a plug. Versatile applicability is thereby ensured. The compressed air inlet ports 25 and 26 may serve as common compressed air inlet ports 2d and 3d respectively for the two relay valves 2 and 3, and may therefore be connected to a common compressed air supply line 50 as shown in FIG. 2. This makes possible, in particular, versatility in connecting the brake pressure modulator 1, for example according to constructional norms in the USA and Europe; thus, the brake pressure modulator 1 may be connected to the additional compressed air line 50, or, for example, directly to a compressed air reservoir, so that the length of the compressed air supply line 50 can in practice be reduced to zero. The two compressed air inlet ports 25 and 26 are here arranged symmetrically with respect to the axis B, that is, opposite to one another, so that, in particular, the pneumatic paths from each of the respective compressed air inlet ports 25 and 26 to each of the two relay valves 2 and 3 are of equal length.

The first relay valve 2, shown to the left of the axis B in FIG. 1, is shown in the delivery position, that is, the actuated position; by contrast, the second relay valve 3, shown to the right of the axis B in FIG. 1, is shown in the vent position, that is, in its unactuated normal position.

The operation will first be described below on the basis of the first relay valve 2. The compressed air inlet port 25 and/or 26 is connected to the compressed air supply line 50 and is formed by a central bore 27 extending through the main housing 8 along the axis B and by wider end-bores 27a and 27b which, in the production of the main housing 8 as a light alloy die-casting, may be formed directly in known fashion by inserted slides. Subsequent machining is in principle unnecessary.

A wider longitudinal bore 29, adjoined at its ends by the covers 10 and 110, extends through the main housing 8 along the axis of symmetry A. The first guide body insert 12 as a part of the first relay valve 2, and the second guide body insert 112 as a part of the second relay valve 3, are inserted in the longitudinal bore 29 and are secured axially towards the outside by the valve seat rings 15, 115 and their securing rings 16, 116. The valve bodies 17, 117 are each guided on the guide body inserts 12 and 112 in the axial direction, or the direction of the axis of symmetry A, advantageously, as shown, with two sealing lips 17a, 17b and 117a, 117b respectively, which slide sealingly on the guide body inserts 12 and 112.

A reservoir pressure p50, which is supplied by the compressed air supply line 50 via one of the compressed air inlet ports 25 or 26, is therefore present in the central transverse bore 27; the reservoir pressure p50 therefore acts on the axially inlet-side ends of the guide body inserts 12 and 112. In the delivery position of the first relay valve 2, the compressed air passes through an outer duct 12a of the guide body insert 12, towards the left in FIG. 1, to a delivery valve seat 31, open in the delivery position, which is formed between the valve seat ring 15 and the valve body 17. The valve body 17 is pressed axially outwards by a helical spring 35 located under preload between the guide body insert 12 and the valve body 17, and is correspondingly closed in the vent position shown in the case of the second relay valve 3 on the right in FIG. 1. The outer duct 12a is formed between a radially outer wall 12b and a radially inner wall 12c of the guide body insert 12. The radially outer wall 12b fits in a sealed manner against the axial bore or against a wall, e.g. a cylindrical wall, of the main housing 8.

In the case of the first relay valve 2 the valve body 17 is open against the preload of the helical spring 35, since control pressure p2 enters a control pressure chamber 36 between the cover 10 and the valve piston 14 via the control pressure inlet 2a and thereby presses the valve piston 14 axially inwards, that is, towards the right in FIG. 1, so that the valve piston 14 presses, for example with an annular (contact) projection 14a, against the valve body 17, and presses the valve body 17 against the spring preloading axially inwards, that is, towards the right in FIG. 1. At the same time, the projection 14a of the valve piston 14 forms with the valve body 17 a vent valve seat 30 which, in the delivery position of the relay valve 2, is correspondingly closed. The compressed air therefore flows from the central transverse bore 27 via the duct 12a in the guide body insert 12 through the open delivery valve seat 31 into an outlet-side compressed air chamber 38 which leads to the brake line 6 at the compressed air outlet 2b, for example in a position arranged offset in the circumferential direction with respect to the section plane shown. As a result of the sufficiently high control pressure p2 acting in the chamber 36, the first relay valve 2 is therefore adjusted; that is, it is in its delivery position, so that compressed air is delivered with a quantity boost via its compressed air outlet 2b.

If the first pneumatic control line 4 is then vented so that the pressure in the chamber 36 drops, the vent position of the second relay valve 3, shown on the right in FIG. 1, is adopted. In this case, because of the falling pressure p2 in the chamber 136, the helical spring 135 presses the valve body 117 axially outwards, that is, in the case of the right-hand second relay valve 3, to the right in FIG. 1 (correspondingly to the left in the case of the first relay valve 2, because of the falling pressure p1 in the chamber 36), and abuts against the valve seat ring 115, so that the delivery valve seat 131 is closed. The pressure-maintenance position is therefore reached.

In order to reach the vent position, the vent valve seat 130 is then opened; that is, the projection 114a of the valve piston 114 lifts away from the valve body 117. Compressed air from the brake line 7, and correspondingly from the outlet-side compressed air chamber 138, can therefore flow via the open vent valve seat 131 in the axial direction via the duct 165, and the ducts formed in the guide body insert 112 radially between the inner wall 112c and the outer wall 112b, into the annular chamber 113 and to the vent 3c. The latter is advantageously provided in the axially inner region around the axis of symmetry A.

The two guide body inserts 12 and 112 may be formed, in particular, as plastics injection moldings which are accommodated in a fixed, that is, non-sliding, manner in the axial or longitudinal bore 29 with their outer sides sealed by sealing rings 18 and 19, and 118 and 119, for example in the form of O-rings, which injection moldings, because of their shaping, make available the pneumatic ducts for the valve operation described above. Because the valve bodies 17 and 117 are also already located in a sealed but sliding manner in the guide body inserts 12 and 112 respectively, only the valve pistons 14 and 114 are provided as additional moving parts, which in turn are guided and sealed in the respective covers 10 and 110 fitted from outside.

In this way the shaping, in particular, of the main housing 8 can be effected without undercuts or like recesses, that is, without subsequent machining of undercut by milling, etc. The longitudinal or axial bore 29 is formed in the axial direction A; in addition, the transverse bore 27, with the widened end bores 27a and 27b which can already be implemented during manufacture via slides without after-treatment by machining, is produced. Into the main housing 8 thus configured the two guide body inserts 12 and 112 are introduced from outside to inside, being advantageously retained and positioned against an edge of the main housing 8 adjacent to the central transverse bore 27. The valve seat ring 15 and the securing ring 16 are then installed from outside, in each case with sealing rings 18, 19, 20 in place, so that the covers 10 and 110 can then be fitted with the valve pistons 14 and 114 already installed via a seal 23, and can be sealed with additional sealing rings 21 and 22, screws 60, 61 and 160, 161 being inserted in the main housing 8 in order to fasten the covers 10 and 110.

FIG. 2 shows a possible activation of the brake modulator 1 via an ABS valve circuit 70 with an electrically actuated 3/2 directional control valve 71, to the output of which are connected two 2/2 stop valves 72 and 73, which in known fashion a control pressure line 51 enable ABS control with a braking pressure p51 predetermined, for example, by the driver, comprising the phases:

Open/increase braking pressure in the neutral position of the ABS control valve 71 and with stop valves 72 and 73 open, that is, in their neutral position, whereby the pneumatic control lines 4 and 5 deliver air pressure to the respective pneumatic control pressure inlets 2a and 3a and therefore adjust the relay valves 2 and 3 to deliver compressed air to the brake lines 6 and 7;

Shut off/maintain brake pressure by closing the respective stop valves 72, 73, and Vent/reduce brake pressure by switching-over the control valve 71 and again opening the stop valves 72 and 73 in order to vent the pneumatic control lines 4 and 5.

The ABS control circuit 70 may be configured, in particular, as a unit which can be installed together with the brake modulator 1 and, in particular, screw-fastened thereto. The valves 71, 72, 73 are activated in known fashion via electrical control signals S1, S2, S3 which are output by an ECU (not shown here).

The brake modulator 1 is applicable, in particular, to a trailer vehicle of an articulated vehicle, but also in principle, for example, to the rear axle braking system of a single vehicle.

LIST OF REFERENCES (PART OF THE DESCRIPTION)

1 Brake modulator, ABS brake modulator
2 First pneumatically activated relay valve
2a Pneumatic control pressure inlet, control pressure port
2b Compressed air outlet
2c Vent
3 Second pneumatically activated relay valve
3a Pneumatic control inlet 3a
3b Compressed air outlet
3c Vent 3c
4 Pneumatic control pressure line
5 Pneumatic control pressure line
6 Brake line
7 Brake line
8 Main housing
10 First cover of first relay valve 2,
12 First guide body insert
110 Second cover of second relay valve 3
112 Second guide body insert,
12a, 112a Outer annular duct of guide body insert
13, 113 Annular duct
14, 114 Valve piston
14a, 114a Annular contact projection
15, 115 Valve seat ring
16, 116 Securing rings
17, 117 Valve body
17a, 117a Sealing lips
18, 19, 20, 21, 22, 23 First sealing rings of first relay valve 2

118, 119, 120, 121, 122, 123 Second sealing rings of second relay valve 3
25, 26 Compressed air inlet ports
27 Central transverse bore
27a, 27b End bores
29 Wider longitudinal bore
30, 130 Vent valve seat
31, 131 Delivery valve seat
36, 136 Control pressure chamber
35, 135 Helical spring
38, 138 Outlet-side compressed air chamber
50 Compressed air supply line of compressed air reservoir
51 Brake control pressure line
60, 61, 160, 161 Screws
70 ABS valve circuit
71 Electrically actuated 3/2 directional control valve, ABS control valve
72, 73 2/2 stop valves
80 Compressed air braking system
A Housing axis
B Central axis
p, p1, p2 Control pressure

What is claimed is:

1. A brake modulator for a compressed air braking system of a vehicle, wherein the brake modulator comprises a main housing in the form of a light alloy die-casting and two relay valves arranged in the main housing in an axial direction of the main housing,
wherein each relay valve comprises:
a pneumatic control inlet, a compressed air inlet, a compressed air outlet and a vent outlet port, a delivery valve seat and a vent valve seat for setting a delivery position and a vent position,
wherein the compressed air inlets of the relay valves are connected via a transverse bore of the main housing to a common compressed air port of the main housing, and a delivery duct extends in the axial direction between the transverse bore and the delivery valve seat, in each relay valve
wherein
the first relay valve has a first guide body insert and the second relay valve has a second guide body insert, the first and second guide body inserts being disposed into a longitudinal bore of the main housing extending in the axial direction, and
a first delivery duct of the first relay valve is formed in the first guide body insert and a second delivery duct of the second relay valve is formed in the second guide body insert.

2. The brake modulator as claimed in claim 1, wherein the main housing has a first compressed air port and a second compressed air port connected via the central transverse bore, which first and second compressed air ports are connectable alternatively or additionally as a common compressed air inlet, the first and second compressed air ports being formed at opposite ends of the central transverse bore.

3. The brake modulator as claimed in claim 2, wherein the first compressed air port and the second compressed air port are arranged symmetrically with respect to one another.

4. The brake modulator as claimed in claim 1, wherein the two relay valves are arranged symmetrically with respect to and/or at equal distances from the central transverse bore.

5. The brake modulator as claimed in claim 1, wherein the first and second guide body inserts are configured as plastics injection moldings.

6. The brake modulator as claimed in claim 1, wherein the first and second guide body inserts are in each case inserted axially from outside into the longitudinal bore.

7. The brake modulator as claimed in claim 1, wherein each relay valve comprises:
a displaceable valve body for abutment against a valve seat ring to form the delivery valve seat, and a valve piston which is displaceable via a pneumatic control pressure for abutment against the valve body to form the vent valve seat,
wherein the relay valves are each adjustable, in dependence on the pneumatic control pressure acting at the pneumatic control inlet, to a delivery position with open delivery valve seat in order to connect the compressed air inlet to the compressed air outlet while blocking the vent outlet, and to a vent position with open vent valve seat in order to connect the compressed air outlet to the vent outlet while blocking the compressed air inlet.

8. The brake modulator as claimed in claim 7, wherein in each relay valve the valve body is located displaceably in the axial direction on the guide body insert and presses with a spring preloading against a valve seat ring to form the delivery valve seat.

9. The brake modulator as claimed in claim 8, wherein the valve seat ring is fitted into the main housing.

10. The brake modulator as claimed in claim 7,
wherein the valve piston can be pressed by the control pressure against the valve body to close the vent valve seat by abutting against the valve body, and to open the delivery valve seat by axially displacing the valve body.

11. The brake modulator as claimed in claim 7, wherein the valve piston is guided axially on a cover fitted from outside to the main housing, a control chamber connected to the pneumatic control inlet being formed between the valve piston and the cover to receive the control pressure.

12. The brake modulator as claimed in claim 7, wherein the valve body is mounted sealingly and axially displaceably on the guide body insert and is spring-loaded axially outwards by a helical spring arranged between the guide body insert and the valve body.

13. The brake modulator as claimed in claim 7, wherein in each relay valve the valve seat ring secures the guide body insert axially towards the outside and forms the delivery valve seat with respect to the valve body.

14. The brake modulator as claimed in claim 13, wherein the valve seat ring is secured axially towards the outside by a securing ring which is accommodated in the main housing.

15. The brake modulator as claimed in claim 1, wherein each relay valve has an outlet-side pressure chamber which:
in the delivery position with the delivery valve seat open is connected to the delivery duct, and
in the vent position is connected via the open vent valve seat to a central vent duct disposed towards the inside in the axial direction and formed in the guide body insert, the two vent ducts formed being connected to the common vent outlet.

16. The brake modulator as claimed in claim 15, wherein each guide body insert comprises:
a radially outer wall for contact with a wall of the main housing,
the delivery duct radially adjacent on the inside to the radially outer wall, and
an inner wall radially adjacent on the inside to the delivery duct, which inner wall surrounds the vent duct.

17. The brake modulator as claimed in claim 15, wherein in the vent position a vent flow passes through the open vent valve seat, the vent duct, then through a radially disposed duct to a radially outer chamber and then to the common vent outlet.

18. The brake modulator as claimed in claim 1, wherein the guide body inserts are configured identically and are arranged symmetrically to one another in the axial direction.

19. A compressed air braking system for a vehicle, wherein the compressed air braking system comprises:
the brake modulator as claimed in claim 1, an electro-pneumatic ABS control circuit which can be activated by electrical control signals and, in dependence on the activation, outputs a first control pressure via the first pneumatic control line to the first pneumatic control pressure inlet and a second pneumatic control pressure via the second pneumatic control line to the second pneumatic control inlet.

20. The compressed air braking system as claimed in claim 19, further defined as a trailer braking system and wherein the brake modulator is a trailer brake modulator of a trailer vehicle.

* * * * *